United States Patent
Navio Gilaberte et al.

(10) Patent No.: US 9,151,278 B2
(45) Date of Patent: Oct. 6, 2015

(54) ECONOMIZER IN SOLAR TOWER PLANT AND OPERATING METHOD OF SAID PLANT

(75) Inventors: Raul Navio Gilaberte, Seville (ES); Jose Maria Mendez Marcos, Seville (ES); Javier Dominguez Rodriguez, Seville (ES); Lucia Serrano Gallar, Seville (ES)

(73) Assignee: Abengoa Solar New Technologies, S.A., Seville (ES)

( * ) Notice: Subject to any disclaimer, the term of this patent is extended or adjusted under 35 U.S.C. 154(b) by 462 days.

(21) Appl. No.: 13/635,289

(22) PCT Filed: Mar. 15, 2011

(86) PCT No.: PCT/ES2011/000074
§ 371 (c)(1),
(2), (4) Date: Apr. 12, 2013

(87) PCT Pub. No.: WO2011/113973
PCT Pub. Date: Sep. 22, 2011

(65) Prior Publication Data
US 2013/0199183 A1   Aug. 8, 2013

(30) Foreign Application Priority Data
Mar. 16, 2010   (ES) .................. 201000346

(51) Int. Cl.
*F03G 6/00* (2006.01)
*F03G 7/00* (2006.01)
*F03G 6/06* (2006.01)
*F22B 1/00* (2006.01)
*F22D 1/00* (2006.01)
*F24J 2/07* (2006.01)

(52) U.S. Cl.
CPC ................ *F03G 6/065* (2013.01); *F22B 1/006* (2013.01); *F22D 1/003* (2013.01); *F24J 2/07* (2013.01); *Y02E 10/41* (2013.01); *Y02E 10/46* (2013.01)

(58) Field of Classification Search
CPC ............. F03G 6/065; F24J 2/07; F22B 1/006; F22D 1/003; Y02E 10/46; Y02E 10/41
USPC ...................... 60/641.8–641.15; 126/684, 685
See application file for complete search history.

(56) References Cited

U.S. PATENT DOCUMENTS

| 3,924,604 A | 12/1975 | Anderson |
| 4,164,123 A | 8/1979 | Smith |

(Continued)

FOREIGN PATENT DOCUMENTS

| DE | 2937529 | 4/1984 |
| EP | 0106687 | 4/1984 |

(Continued)

OTHER PUBLICATIONS

ISR for PCT/ES2011/000074 mailed on Jul. 26, 2011.

(Continued)

*Primary Examiner* — Hoang Nguyen
(74) *Attorney, Agent, or Firm* — Kilpatrick Townsend & Stockton LLP

(57) ABSTRACT

An economizer in a solar tower plant and operating method of said plant the purpose whereof is to make use of the heat from the heat losses generated around the solar tower receivers (3) to preheat the fluid with which the saturated steam or superheated steam solar receivers are fed. When the heat from the losses absorbed by the economizer (2) is not sufficient to achieve the necessary minimum temperature, a secondary economizer (4) is used which takes live steam (prior to it entering the turbine) and increases the temperature of the feed water of the receiver (3).

15 Claims, 2 Drawing Sheets

(56) References Cited

U.S. PATENT DOCUMENTS

| | | | |
|---|---|---|---|
| 4,400,946 A | 8/1983 | Oplatka | |
| 4,485,803 A * | 12/1984 | Wiener | 126/591 |
| 4,512,336 A | 4/1985 | Wiener | |
| 4,567,733 A * | 2/1986 | Mecozzi | 62/175 |
| 6,911,110 B2 | 6/2005 | Blackmon, Jr. et al. | |
| 2009/0241939 A1* | 10/2009 | Heap et al. | 126/645 |
| 2009/0261591 A1* | 10/2009 | Palkes et al. | 290/52 |
| 2012/0234311 A1* | 9/2012 | Johnson et al. | 126/600 |

FOREIGN PATENT DOCUMENTS

| | | |
|---|---|---|
| EP | 0106688 | 4/1984 |
| EP | 2000669 | 10/2008 |
| FR | 2438804 | 10/1978 |
| FR | 2436341 | 4/1980 |
| WO | 2009/105689 | 2/2008 |
| WO | 2008/118980 | 10/2008 |
| WO | 2008/153922 | 12/2008 |
| WO | 2008/154599 | 12/2008 |
| WO | 2009/044622 | 4/2009 |

OTHER PUBLICATIONS

IPRP for related PCT/ES2011/000074 issued on Sep. 18, 2012, and its English translation.
Extended European Search Report for PCT/ES2011/000074, mailed on Oct. 10, 2014, 8 pages.
Office Action for the Republic of China, Application No. 2011/800233947, mailed on Jun. 4, 2014, 4 pages.
Chilean Office Action mailed on Sep. 9, 2012, 7 pages.

* cited by examiner

ECONOMIZER IN SOLAR TOWER PLANT AND OPERATING METHOD OF SAID PLANT

CROSS-REFERENCE TO RELATED APPLICATIONS

This application is the U.S. National Stage of International Patent Application No. PCT/ES2011/000074 filed on Mar. 15, 2011, which claims priority to Spanish Patent Application No. P201000346 filed Mar. 16, 2010, the disclosures of which are hereby incorporated by reference in their entireties.

TECHNICAL FIELD OF THE INVENTION

The present invention falls within the technology relating to thermoelectric solar plants with a central receiver for the production of electricity or process heat.

More specifically, it relates to both saturated and superheated steam solar receptor tower plants.

BACKGROUND OF THE INVENTION

Solar Concentration Systems (SCS) are used to increase the temperature of a working fluid by concentrating solar radiation thereon and making use of this heat energy, whether in industrial processes or in electrical power generation processes. Within the SCSs is found the central receiver tower systems, wherein solar radiation is concentrated by heliostats onto a receiver located at the top of a tower wherein it is transformed into thermal energy by the absorption of heat by the working fluid. An initial approach to central tower receiver technology according to patent U.S. Pat. No. 3,924,604 of 1974; the receiver described therein is the exterior type and has tubes arranged around the central axis of the tower, being located at the top of the tower, which in turn is located in the centre of a field of heliostats disposed in a circular manner. Subsequently, in 1983, a new configuration for a solar concentration tower plant was described by patent U.S. Pat. No. 4,400,946 wherein steam generation in a receptor disposed in a ring of a circular sector of the circumference described by the tower; other patents relating to this technology have been published since then seeking the optimisation of the different elements and processes of the system, such as U.S. Pat. No. 6,911,110 and WO2008118980, published in 2005 and 2008 respectively. One of the most important factors to be taken into account when a solar receiver is designed is heat losses. Heat losses in a solar concentration receiver tower are estimated at approximately 10%-20%, depending on the design. These losses may be of two kinds, heat losses by radiation and heat losses by convection. Furthermore, heat losses by radiation may be heat losses by reflection from the material and heat losses by emission from the material.

To increase the efficiency of solar concentration systems, different developments tend to be applied in the state serving to preheat the water which will circulate in the receiver.

Document WO 2009/044622 A1 describes a way to preheat the water by circulating it through tubes exposed to solar radiation before being sent to the receiver. Document WO 2008/154599 A1 also describes a way to preheat the water by passing it over electric preheaters which raise the temperature thereof before it enters the actual solar plant circuit.

Both solutions are examples of how to increase the efficiency of the system by preheating the water or heat transfer fluid before it circulates in the solar receiver, in order to obtain a higher temperature at the output of the receiver and, consequently, higher performance in the turbine and, therefore, greater system efficiency.

However, both developments use new energy to preheat the water. In the former case, the water is preheated with solar rays, which means a large area of land needs to be occupied by these tubes, as well as requiring the receptor not to be elevated. In the latter case, the water is preheated with an electric resistor, i.e., part of the energy which the plant produces is used to preheat the water, meaning that plant efficiency is penalised because of this self-consumption of electricity.

For all of these reasons, the object of the present invention is to provide a system for preheating the water before it enters the receiver which however differs from the known state of the art in that as preheating energy it uses the heat losses from the receiver itself, considerably increasing plant efficiency.

DESCRIPTION OF THE INVENTION

The following invention consists of a solar tower receiver system wherein there is recovery of lost heat by the provision of an economizer on the top of a receiver.

An economizer system has been designed to increase the efficiency of a tower receiver, whether using saturated or superheated steam. This economizer collects the heat from the thermal losses of the receiver, whether losses through convection, reflection, or losses through radiation due to the emissivity of the material of which the receiver is manufactured.

The economizer consists of a heat exchanger through which a fluid (preferably water) circulates, the purpose whereof is to preheat said fluid.

The economizer is located at the top of the receiver such that it may make use of the heat given off by the latter through the heat losses generated. Because of this thermal energy, said fluid in the economizer is preheated until it attains the necessary temperature. If the fluid is water, this temperature is the required temperature for it to enter the drum. The water in the drum passes directly to the saturated steam receiver. The steam leaving the saturated steam receiver is sent directly to the turbine or first to the superheated steam receiver, if there is one, and then to the turbine.

Just as an economizer exists to take advantage of the thermal energy of losses from the saturated steam receiver, another may be installed on the superheated steam receiver, if there is one, having the same purpose, that is to say, to preheat the water before it enters the drum.

In this way the efficiency of the cycle is increased by 8-16%, depending on the heat losses and the geometry of the receptor, independently of whether the receiver is of saturated or superheated steam.

This percentage of recovery corresponds to a high-pressure economizer. A high-pressure economizer is one working at pressures exceeding 90 bar, the economizer thus replacing the high-pressure heaters existing in traditional plants.

If the heat from losses is not sufficient to increase the temperature of the fluid (preferably water) to the necessary temperature, a secondary economizer may be installed.

The secondary economizer consists of a high-pressure heater, also installed at the top of the tower. It takes live steam, that is to say part of the steam is extracted prior to it entering the turbine and this team is used to increase the temperature of the fluid feeding the receiver in a heat exchanger. Drainage from this secondary economizer will be sent directly to the drum using a small pump or to the deaerator by a pipe to it from the top of the tower.

With this design of solar tower, with economizer units based on the use of the heat from the heat losses, the efficiency of the system is drastically increased for two basic reasons:

the fluid entering the receiver is preheated and advantage is taken of the heat from the heat losses.

DESCRIPTION OF THE DRAWINGS

To complete the description made herein and to assist in the better comprehension of the invention, a set of drawings is included wherein, for purposes of illustration and without being limitative, the following is represented.

The references shown in the figures represent the following elements.

Figure 1:
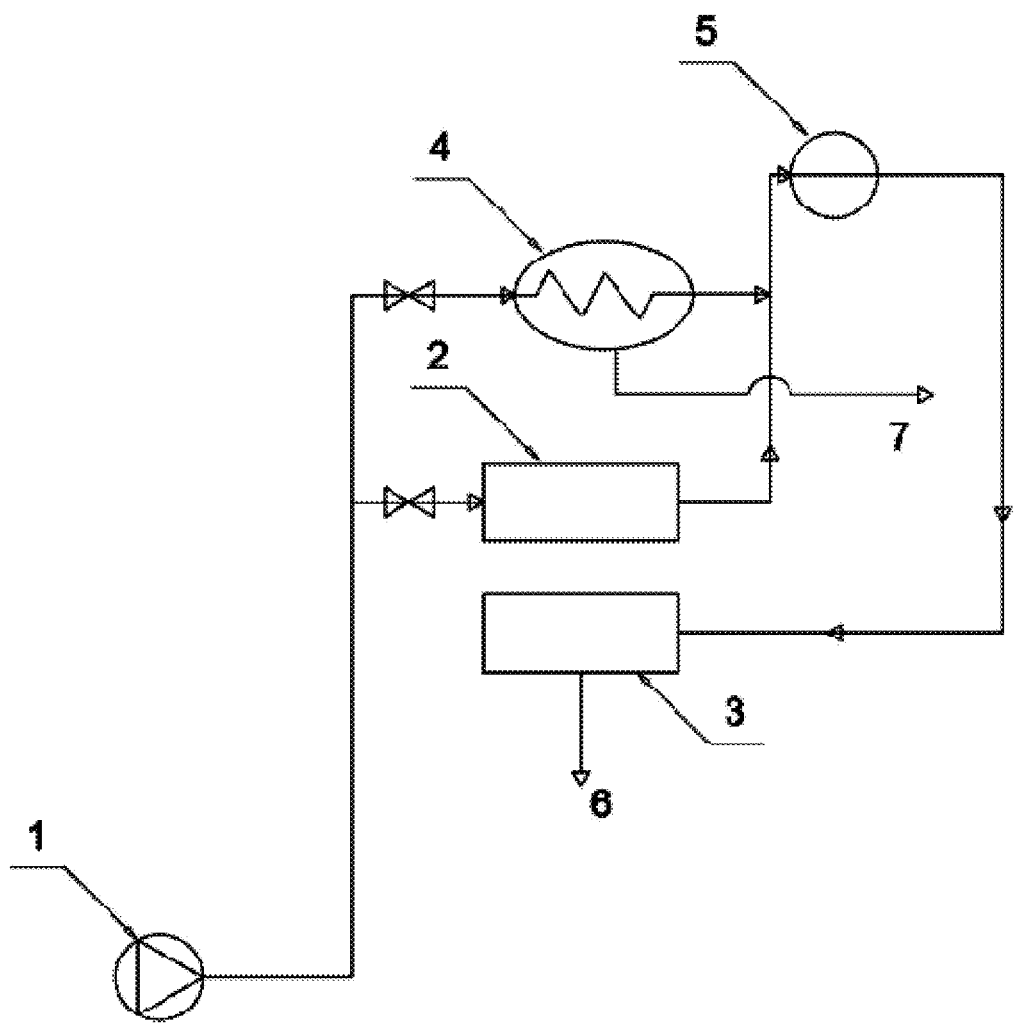
FIG. 1: The steam circulation system wherein the economizer is included

(1) Feed pumps
(2) Economizer
(3) Receiver
(4) Secondary economizer
(5) Drum
(6) Steam output to turbine or superheated steam receiver
(7) Output to the deaerator
(8) Receiver walls
(9) Solar ray

PREFERRED EMBODIMENT OF THE INVENTION

To achieve better understanding of the invention, the solar economizer on solar tower receivers will be described according to a preferred embodiment wherein the fluid circulating through the receiver is water.

Firstly, as shown in FIG. 1, the circuit comprises feed pumps (1) which are responsible for supplying water to the receiver (3), after the preheating thereof. At the output from the water feed pumps (1), the subcooled water (at approximately 110° C.) is lifted to the top of the tower. This water is circulated through the economizer (2).

In the economizer (2) (which in a preferred embodiment is located on the roof of the receiver (3)), the water at 110° C. is heated by the energy from losses from the receiver (3).

The water leaving the economizer (2) is sent directly to the drum (5).

The output from the drum (5) is connected to the input of the saturated receiver (3), 25 such that the water entering the receiver (3) is already at a high temperature. The saturated steam (6) leaving the saturated steam receiver (3) is taken directly to the turbine if it is not to be superheated, or to a superheated steam receiver and then to the turbine.

The heat from losses may not be sufficient to achieve the necessary temperature to enter the drum (5); in that case, the water feed pumps (1) will send part of said water to a secondary economizer (4) located in parallel with the first economizer (2). This secondary economizer (4) comprises a high-pressure exchanger or heater located at the top of the tower. Live steam, that is to say, steam extracted from the turbine, is circulated through this exchanger and used to transmit heat to the feed water and increase the temperature thereof before it enters the drum (5).

The preheated water from either of the two economizers (2, 4) is taken to the drum (5) and thence to the receiver (3).

Figure 2:
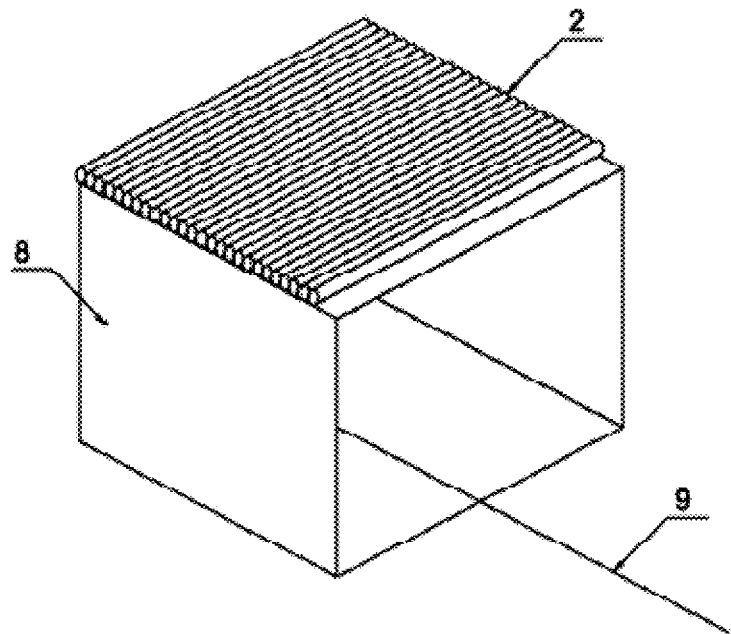
FIG. 2: Economizer arranged on the receiver as a plane
Figure 3:
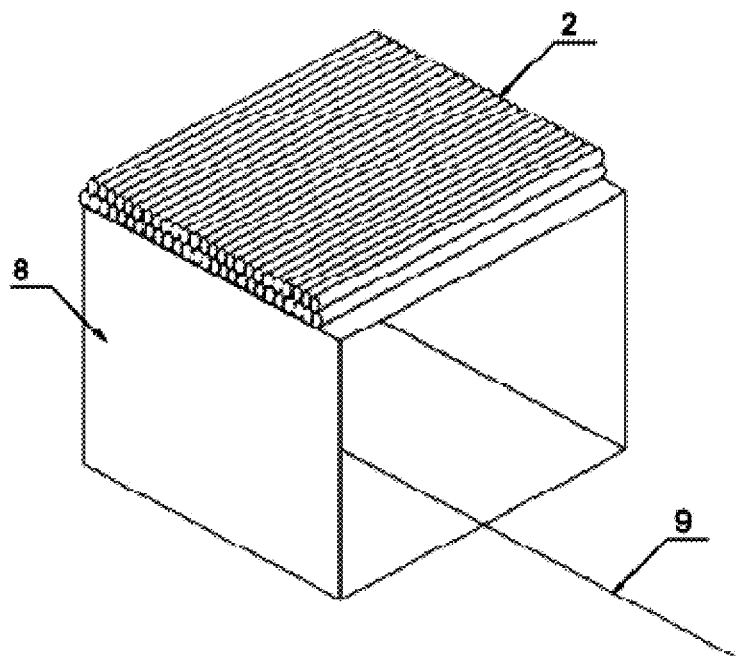
FIG. 3: Economizer arranged on the receiver as a bundle

As shown in FIG. 2, and according to a preferred embodiment, the geometry of the economizer (2) includes a panel of tubes with or without fins located on the receiver (3) in the form of a plane. It may also be configured as a bundle of tubes, as shown in FIG. 3. Consequently, the heat due to the losses rises through the cavity of the receiver and heats the cold water.

This economizer (2) will have a special covering having an absorptivity exceeding 0.9 to accept all the heat which it receives and may be built of steel.

As shown in FIGS. 2 and 3, this economizer system is installed on top of the receiver (3), such that the heat given off by the heat losses, whether by radiation, convection or reflection or through conduction by the material of which the receiver is made, is captured by the economizer (2).

An economizer may be installed on both receivers of saturated steam and on receivers of superheated steam, that is to say, on the same tower there may be as many economizers as there are receivers, whatever their kind may be.

Although the system has been designed for the application thereof on solar tower receivers, the use thereof in other fields of industry requiring similar features is also possible.

The invention claimed is:

1. A solar tower plant comprising:
    a tower;
    one or more receivers located at the top of the tower;
    a solar field of heliostats which reflect solar radiation and direct it towards the one or more receivers, producing in those receivers the heating of a fluid to be supplied to a turbine to produce electricity; and
    an economizer comprising a series of tubes arranged as a plane or bundle on at least one of the one or more receivers and in the interior whereof circulates the fluid with which the one or more receivers are fed, absorbing calorific energy given off by the heat losses from the one or more receivers, to preheat the fluid before the fluid is supplied to the one or more receivers for heating by solar radiation from the heliostats.

2. A solar tower plant according to claim 1, wherein the tubes have fins.

3. A solar tower plant according to claim 1, wherein the economizer has a special covering with absorptivity exceeding 0.9 to accept all the heat which it receives.

4. A solar tower plant according to claim 1, wherein the economizer is a first economizer, the solar tower plant further comprising a secondary economizer installed in parallel with the first economizer, at the top of the tower, wherein steam circulates through the secondary economizer and heat from the steam is transmitted to the fluid to preheat the fluid before the fluid is supplied to the one or more receivers for heating by solar radiation from the heliostats.

5. A solar tower plant according to claim 4, wherein the secondary economizer includes a high pressure exchanger or heater.

6. A solar tower plant according to claim 4, wherein the steam that circulates through the secondary economizer is live steam extracted from the turbine.

7. A solar tower plant according to claim 1, wherein a drum is placed between the economizer and the one or more receivers.

8. A solar tower plant according to claim 4, wherein a drum is placed between the outlets of the first economizer and the secondary economizer and the one or more receivers.

9. A method of operating a solar plant with economizer, the method comprising:
    feeding subcooled water via feed pumps to the top of a tower where it circulates through the economizer wherein it is preheated by heat lost from one or more receivers that receive solar radiation reflected from a number of heliostats, the economizer being on at least one of the one or more receivers;

sending the water leaving the economizer to the one or more receivers;

heating the water in the one or more receivers to produce steam, using the solar radiation directed to the one or more receivers from the heliostats; and providing the steam leaving the one or more receivers to a turbine to generate electricity.

10. The method of operating the solar plant with economizer according to claim 9 wherein the economizer is a first economizer and wherein, the feed pumps send part of the water to a secondary economizer that increases the temperature of the feed water using heat transfer from steam extracted from the turbine, and the preheated water from either of the first economizer and the secondary economizer is sent to the one or more receivers.

11. The operating method of the solar plant with economizer according to claim 10, wherein the water leaving the first economizer is sent to a drum the output whereof is connected to the input of the one or more receivers.

12. The operating method of the solar plant with economizer according to claim 10 wherein the water leaving the secondary economizer is sent to a drum the output whereof is connected to the input of the one or more receivers.

13. A solar tower plant according to claim 8, further comprising a set of valves, wherein by opening and closing certain of the valves the solar tower plant can be placed in each of the following configurations:

the fluid passes through only the first economizer;

the fluid passes through only the secondary economizer; and the fluid passes through both the first and secondary economizers in parallel.

14. The operating method of the solar plant with economizer according to claim 9, wherein the water leaving the economizer is sent to a drum the output whereof is connected to the input of the one or more receivers.

15. The operating method of the solar plant with economizer according to claim 10, wherein the water leaving both the first economizer and the secondary economizer is sent to a drum the output whereof is connected to the input of the one or more receivers.

* * * * *